UNITED STATES PATENT OFFICE.

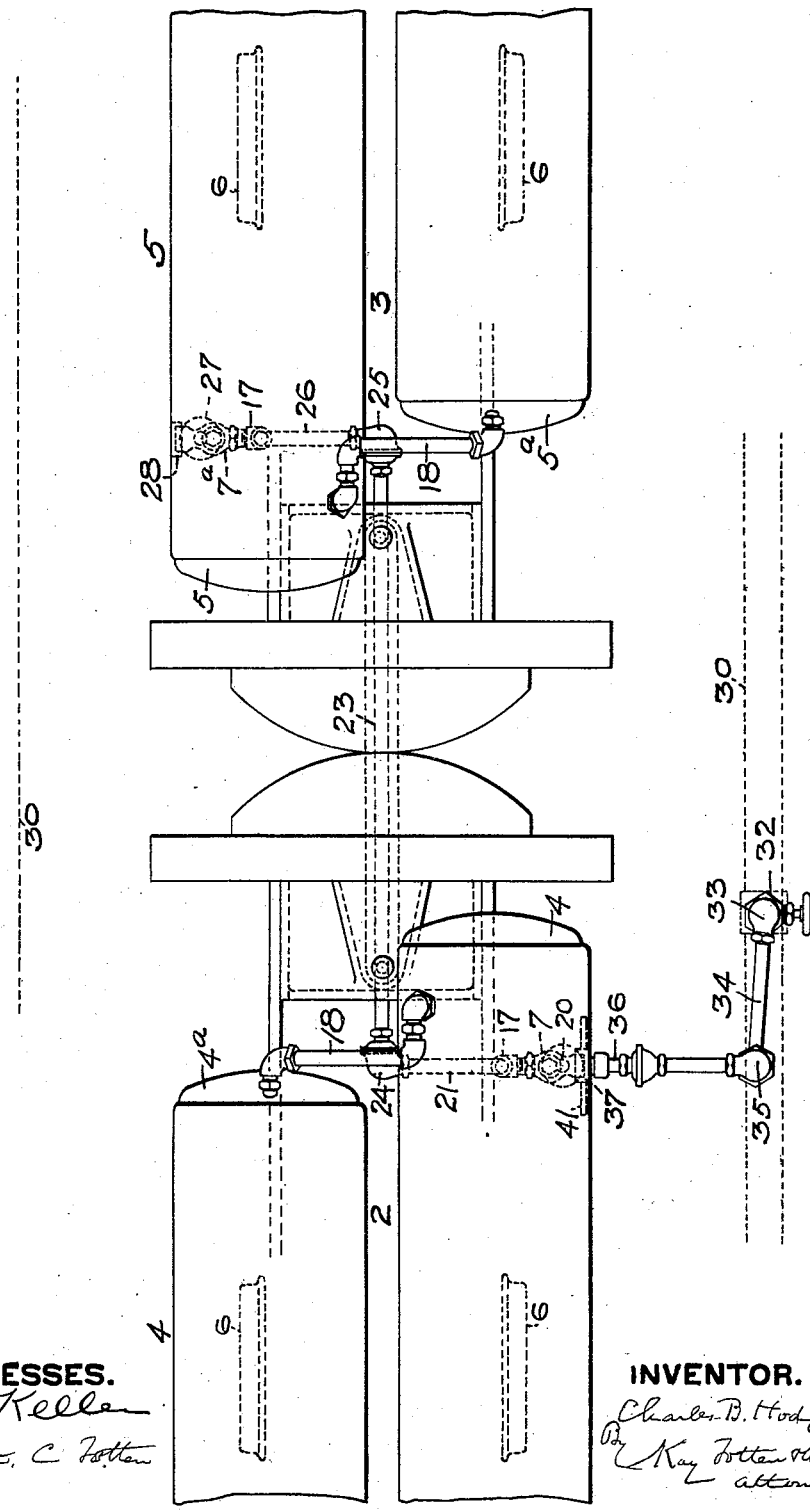

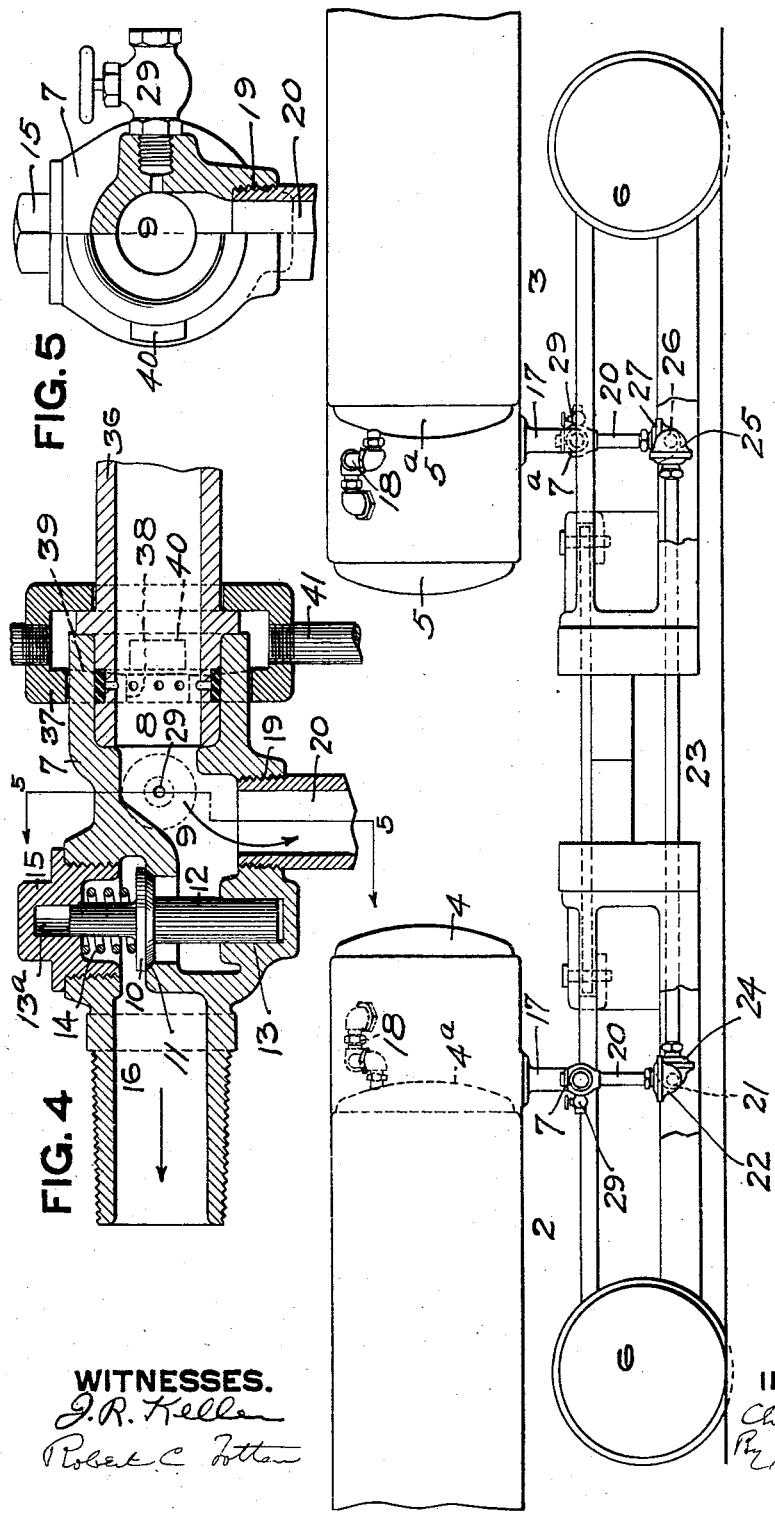

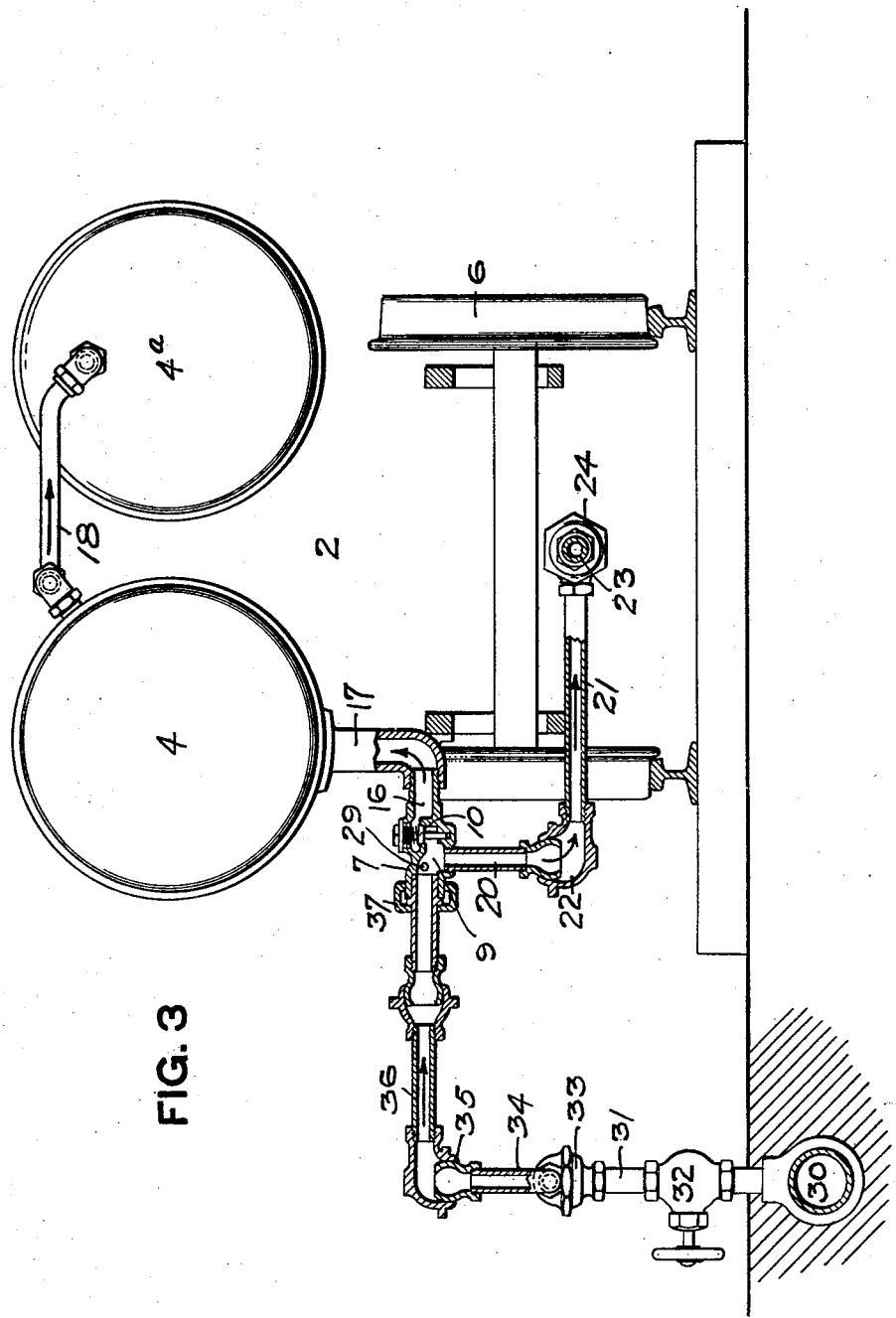

CHARLES B. HODGES, OF PITTSBURG, PENNSYLVANIA.

APPARATUS FOR CHARGING LOCOMOTIVES.

No. 901,617.　　　　Specification of Letters Patent.　　　　Patented Oct. 20, 1908.

Application filed April 27, 1908.　Serial No. 429,460.

*To all whom it may concern:*

Be it known that I, CHARLES B. HODGES, a resident of Pittsburg, in the county of Allegheny and State of Pennsylvania, have invented a new and useful Improvement in Apparatus for Charging Locomotives; and I do hereby declare the following to be a full, clear, and exact description thereof.

My invention relates to apparatus for charging compressed air locomotives.

As the power required in hauling trains through the tunnels or gangways of mines frequently exceeds the power which it is convenient to develop in one locomotive of this character, the use of two locomotives in tandem is often resorted to. In such case the two locomotives are more economically operated by one set of levers or handles, and so arranged that the attention of but one man is required to operate both; and furthermore, it is extremely desirable in order to save time that both locomotives should be charged simultaneously and that it should only require the coupling and uncoupling of one connection with the source of supply of compressed air from which the locomotives are charged. Where, however, such an expedient is resorted to it is necessary to employ flexible pipe connections between the locomotives in order to provide for the distortion and changes of position to which the coupling would be subjected in operating the two locomotives around curves and over grades in tracks as ordinarily found in mines. Such flexible connections if allowed to remain charged while the locomotives are in motion would be a source of grave danger to the operator whose position is almost directly over this connection, as this connection would be subjected to the high pressure carried in the reservoirs of tanks on the locomotives, namely, from 700 to 1500 lbs. per square inch. Such a high pressure precludes the use of rubber hose and a flexible metallic coupling composed of ball or like joints and metal pipe must be employed, and when such a pressure is contained within a flexible coupling of this character the intense pressure on the rubbing surfaces due to the high pressure which the coupling must sustain if it remain charged would result in serious frictional resistance to the movements of the joints, which must occur in compensating for the movements of the two tandem locomotives while in motion in relation to each other. Such stresses due to the frictional resistance of the joints in addition to the primary stress of the pressure would unquestionably result in frequent accidents.

The object of my invention is to provide apparatus by means of which compressed air locomotives in tandem may be charged simultaneously by connection to a single source of supply and the couplings relieved of pressure immediately after the charging operation, whereby all danger is removed and the locomotives charged quickly while remaining in the one position.

To these ends my invention comprises, generally stated, two check valves, connections between said check valves and the tanks or reservoirs of the locomotives, flexible pipe connections between said valves, means for connecting said valves up with a single source of supply, and means for discharging the pressure from said pipe connections after the reservoirs or tanks have been charged.

In the accompanying drawings Figure 1 is a plan view; Fig. 2 is a side elevation of my improved apparatus, the locomotives being largely diagrammatic; Fig. 3 is an enlarged detail of the manner of connecting up the supply pipe with the check valve; Figs. 4 and 5 are enlarged detail views of the check valve.

Referring to the drawing the numerals 2 and 3 indicate compressed air locomotives of the ordinary type in which the tanks 4 and 5 are mounted upon suitable truck frames supported by wheels 6. As the locomotives themselves form no part of my invention I have not deemed it necessary to illustrate the same further than in the diagrammatic form indicated.

The check valves 7 and $7^a$ comprise the shell or casing having the inlet 8 leading to the passage 9. The valve 10 normally rests on the seat 11 and said valve is provided with the guide-stem 12 which fits in the seat 13. The upper portion of the stem 12 enters the seat $13^a$ and is surrounded with the spring 14 bearing against the upper face of said valve and against the cap or plug 15. The valve casing or body is further provided with the passage 16 which leads to the coupling 17 connected up to the tank 5. Each of the locomotives illustrated has two tanks 5 and $5^a$ and these are connected by ordinary rigid couplings 18. A threaded opening 19 is tapped in the valve casing in the supply side.

Connected to said opening is the pipe section 20 and said pipe section 20 is connected with the pipe section 21 by means of a suitable ball and socket joint 22. Any suitable flexible joint may be employed. The pipe 21 is connected to the pipe 23 by a like ball and socket joint 24 and the opposite end of the pipe 23 is connected by a ball and socket joint 25 to the pipe 26. The pipe 26 is connected by the ball and socket joint 27 to the passage 9 of the check valve $7^a$. As the check valve 7 is the one illustrated as connecting up with the source of supply the outlet of the check valve $7^a$ is capped with the cap 28. The valves 7 and $7^a$ are also provided with the bleeder valves 29 leading to the atmosphere.

A supply pipe 30 leading from the compressor may be located at one side of the track upon which the locomotives travel. The pipe 31 is connected to the supply pipe 30 and in said pipe is the valve 32. A flexible coupling 33 connects the pipe 31 to the pipe 34. A ball and socket 35 at the outer end of the pipe 34 is connected up to the coupling 36. This coupling 36 has the inwardly projecting flange 37 and the notches 38 formed therein. The inner face of the flange 37 is provided with the cam 39. To make the connection with the valve 7 the valve casing is provided with the lugs 40 which are adapted to enter the grooves 38 and when thus inserted the handle 41 of the coupling is turned and the cam face 39 acts to make a tight joint.

When it is desired to charge the reservoirs of the locomotives with my improved apparatus, the locomotive 2 is brought up into position with reference to the connection 34, so that said connection may be readily connected up to the valve 7 in the manner above set forth. As soon as this connection has been made the air pressure is turned on at the valve 32 and the air rushes through the valve 32, lifting the check-valve and passes into the reservoirs 4 and $4^a$, while at the same time it also passes through the pipe 20 and the connections therewith to the valve $7^a$, whence it passes into the reservoirs 5 and $5^a$ of the other locomotive. As soon as the reservoirs have been charged the valve 32 is closed. The pressure, in the pipe connections however, may at once be released by opening the bleeder valve 29 so that all danger from such excessive pressure in the pipe connections is at once removed and the connections opened to the atmosphere. Just as soon as this is done the check-valves will close and retain the air within the reservoirs. This may be accomplished before the coupling 36 is disconnected from the valve 7, but it is apparent that as soon as this disconnection takes place the pressure within the pipe connections is released automatically, so that in case the operator neglects to release the pressure by the bleeder valves he cannot help releasing the pressure when he uncouples the locomotive from the supply pipe.

It is apparent that the locomotives may be charged from either side of the track by simply removing the cap 28 from the valve $7^a$ and applying this cap to the valve 7 so that connection can be made from the opposite side of the track where the supply pipe is located in that position. Furthermore, by plugging up the openings 19 where the locomotives are to be used separately, the charging may be done to the tank of each locomotive independently.

The device provides a safe and rapid means of charging simultaneously two locomotives coupled in tandem from either side, and the charging is done quickly and rapidly because it is only necessary to make one coupling and does not require the moving of the locomotives after the initial coupling is made. All the dangers due to the high pressure within the coupling while the locomotive is in motion are avoided, and the operator runs absolutely no risk from this cause, and the abrasion and consequent rapid wear and leakage of joints due to excessive pressure is obviated.

What I claim is:

1. In apparatus for charging compressed air locomotives in tandem, the combination with a supply pipe, of reservoirs, flexible pipe connections between said reservoirs, means for connecting up said connections with said supply pipe, means for cutting off said reservoirs from said connections, and means for releasing the pressure from said connections.

2. In apparatus for charging compressed air locomotives in tandem, the combination with a supply pipe, of reservoirs, flexible pipe connections between said reservoirs, check-valves controlling the supply to said reservoirs, and means for releasing the pressure from said pipe connections when said check valves are closed.

3. In apparatus for charging compressed air locomotives in tandem, the combination with a supply pipe, of reservoirs, check-valves, freely releasable connections between one of said check-valves and said supply pipe, flexible pipe connections from one check-valve to the other, connections between said check-valves and said reservoirs, and means for releasing the pressure in said flexible pipe connections.

4. In apparatus for charging compressed air locomotives in tandem, the combination with a supply-pipe, of reservoirs, check-valves, connections between said check-valves and said reservoirs, flexible pipe connections between said check-valves, freely releasable connections between said supply-pipe and one of said check-valves, and a bleeder-valve to release the pressure from said flexible pipe connections.

5. In apparatus for charging compressed air locomotives in tandem, the combination with a supply-pipe, of reservoirs, check-valves, connections between said valves and said reservoirs, flexible pipe connections from the supply side of the casing of one of said check-valves to the supply side of the casing of the other valve, the supply opening of one of said casings being closed, means for connecting up the other casing to said supply-pipe, and means for releasing the pressure from said flexible connections before or at the time that said locomotives are disconnected from said supply-pipe.

In testimony whereof, I the said CHARLES B. HODGES have hereunto set my hand.

CHARLES B. HODGES.

Witnesses:
ROBERT C. TOTTEN,
J. R. KELLER.